No. 670,467. Patented Mar. 26, 1901.
R. A. BROWN.
COTTON PLANTER.
(Application filed Dec. 17, 1900.)
(No Model.)
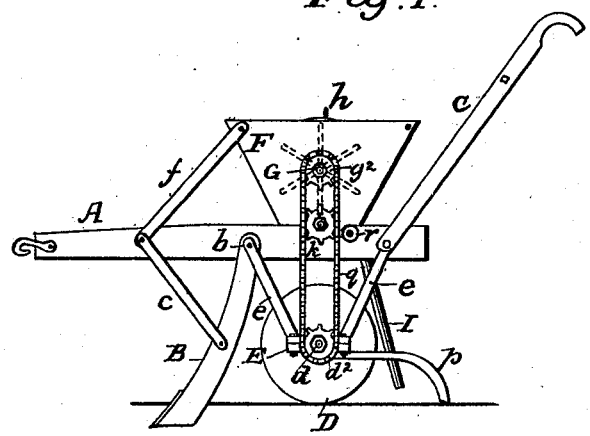
Fig. 1.
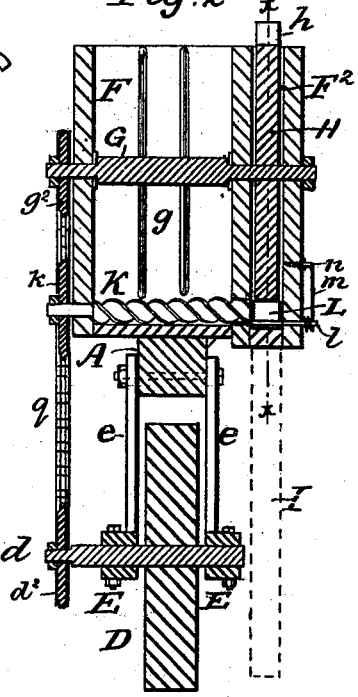
Fig. 2.
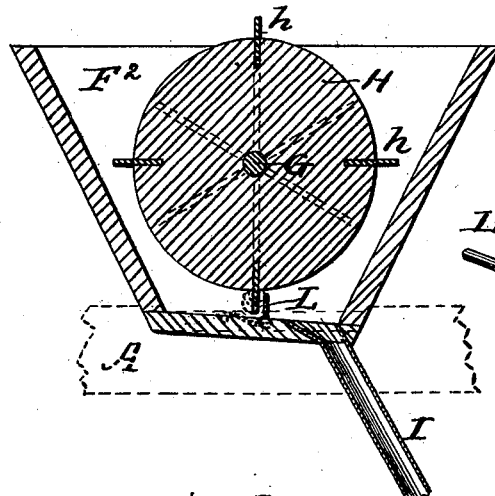
Fig. 3.
Fig. 4.
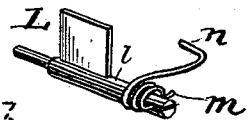
Fig. 5.
Witnesses
R. F. Storm
I. J. Masson
Inventor
Robert A. Brown
By E. E. Masson, his Attorney
THE NORRIS PETERS CO., PHOTO-LITHO., WASHINGTON, D. C.

UNITED STATES PATENT OFFICE.

ROBERT A. BROWN, OF AMERICUS, GEORGIA, ASSIGNOR OF TWO-THIRDS TO JOHN L. HARPER, AGENT, AND JAMES S. ROARK, OF SAME PLACE.

COTTON-PLANTER.

SPECIFICATION forming part of Letters Patent No. 670,467, dated March 26, 1901.

Application filed December 17, 1900. Serial No. 40,172. (No model.)

*To all whom it may concern:*

Be it known that I, ROBERT A. BROWN, a citizen of the United States, residing at Americus, in the county of Sumter and State of Georgia, have invented certain new and useful Improvements in Cotton-Planters, of which the following is a specification, reference being had therein to the accompanying drawings.

The object of this invention is to produce a simple, inexpensive, and reliable planter to drop the seed at any desired distance apart in rows. I attain this object by the construction illustrated in the accompanying drawings, in which—

Figure 1 is a side view of a cotton-planter constructed in accordance with my invention. Fig. 2 is a transverse section of the same, taken through the center of the hopper. Fig. 3 is a longitudinal vertical section through the wiper-carrying feed-wheel and chamber containing it and through the spring-gate which temporarily arrests the seed. Fig. 4 is a perspective view of the gate and its spring on a large scale. Fig. 5 is a perspective view of a partly-inclosed feed-screw of smaller diameter for planting corn or peas.

In said drawings, A represents the plow-beam of the planter, to which the upper end of the plow-stock B is secured at $b$. The latter is also retained by a forward brace $c$, having its upper end secured to the beam A. The rear end of said beam is provided with a pair of handles C, as usual. The rear portion of the beam A is carried by a ground-wheel D, the axle $d$ of which is received in journal-boxes E, secured to the lower ends of divergent braces $e$, the upper ends of which are secured to the sides of the beam A.

On the top of the beam is secured the seed-hopper F, and as additional attachments there are braces $f$ secured to the front upper portion of the hopper and to the beam. Through the sides of the hopper passes a shaft G, having wire prongs $g$ passing diametrically therethrough to stir the seed during their revolutions. Upon the shaft G there is also mounted a disk H, having a series of radial paddles or seed-wipers $h$ to advance the seed toward the outlet-pipe I. Said disk is located in a narrow chamber $F^2$ alongside of the hopper F and having the general contour of said hopper, but its bottom on a slightly-lower level and inclined toward the outlet-pipe I.

To direct and advance the seed from the hopper F laterally into the bottom of the chamber $F^2$, an auger-like screw K is placed horizontally in a semicylindrical trough-like cavity formed into the bottom of the hopper F. To prevent the seed issuing from the end of the screw onto the bottom of the chamber $F^2$ from advancing toward the outlet-pipe I until there is a sufficient number of them collected for a hill of plants, a flap-gate L of sheet metal is made to normally stand vertically over the bottom of the chamber $F^2$, but is pivoted to the sides upon a pivot-pin $l$, the outer end of which has a slot diametrically therethrough to receive tightly therein one end of a spiral spring $m$, coiled around it, and having its other end $n$ secured into the wall of the chamber $F^2$. The distance apart between each dropping of seed is regulated by the numbers of seed-wipers $h$ placed around the periphery of the disk H. The advance of the wipers forces the seed against the flap-gate L, depresses it nearly horizontally, and advances the seed into the flaring upper end of the outlet-pipe I, from which it drops upon the ground and is covered by the spring-bar $p$, which is extended to the rear of the outlet-pipe.

To rotate the upper shaft G and also the auger-like screw K, there is mounted upon one end of the axle $d$ of the ground-wheel a sprocket-wheel $d^2$ and upon the end of the screw K a sprocket-wheel $k$ and upon the end of the shaft G a sprocket-wheel $g^2$, and said three sprocket-wheels are placed in rotatory connection by means of a chain $q$, which engage the sprockets of each wheel, a guide-roller $r$ being preferably placed at a short distance from the periphery of the wheel $k$ to insure the engagement of said chain therewith. In Fig. 5 is shown a feed-screw K of smaller diameter to advance seeds, as corn and peas. It is partly inclosed in a stationary sleeve $s$, having the same diameter as the cotton-feeding screw.

Having now fully described my invention, I claim—

1. In a seed-planter the combination of a plow-beam, a plow-stock secured thereto, a ground-wheel under said beam, a double-chambered hopper upon said stock, a shaft passing through both chambers, seed-stirring prongs mounted upon said shaft within the widest chamber, a disk also mounted upon said shaft in the narrowest chamber and having seed-wipers on its periphery, an auger-like screw in the bottom of the wide chamber, a spring-retained flap-gate in the bottom of the narrow chamber, three sprocket-wheels mounted on said shafts located above each other, and a chain connecting said three sprocket-wheels substantially as described.

2. The combination of a seed-planter beam, a ground-wheel under said beam, a double-chambered hopper on top of said beam, a disk having seed-wipers upon its periphery and located in one of said chambers, a spring-retained flap-gate in the narrowest of said chambers, an auger-like screw in the bottom of the wider chamber and means as described to rotate said disk and screw substantially as described.

In testimony whereof I affix my signature in presence of two witnesses.

ROBERT A. BROWN.

Witnesses:
A. T. ANSLEY,
T. A. GRAHAM.